United States Patent [19]

Yamada et al.

[11] Patent Number: 4,992,892
[45] Date of Patent: Feb. 12, 1991

[54] MUSIC START SIGNALS IN A MAGNETIC RECORDING/REPRODUCING DEVICE

[75] Inventors: Tomoyasu Yamada; Tetsuro Nagao; Nobutoshi Fukuda; Masashi Tanabe; Yoshiki Furuta; Shinichi Yamamisaka; Naoto Arifuku, all of Saitama, Japan

[73] Assignee: Pioneer Electronic Corporation, Tokyo, Japan

[21] Appl. No.: 5,981

[22] Filed: Jan. 22, 1987

[30] Foreign Application Priority Data

Jan. 22, 1986 [JP] Japan .................................. 61-11298
Sep. 18, 1986 [JP] Japan .................................. 61-142892

[51] Int. Cl.$^5$ ........................... G11B 5/02; G11B 5/00
[52] U.S. Cl. ........................................ 360/27; 360/32
[58] Field of Search ............................. 360/27, 32, 49

Primary Examiner—Vincent P. Canney
Attorney, Agent, or Firm—Sughrue, Mion, Zinn, Macpeak & Seas

[57] ABSTRACT

In a stereo sound digital recording system in which a plurality of tunes or programs are sequentially and digitally recorded on a magnetic tape, the left and right analog input signals are combined and converted to a digital signal. The analog input signals are also applied to a detector which detects the head of the program or tune and which causes to be generated a start identification sub-code signal which is automatically added to the digital signal, before the modulation thereof, and which is recorded on the tape for about nine seconds in the non-sound portion preceding the tune or program. A second sub-code signal, in the form of a program number signal, may also be added to the digital signal, simultaneously with the program start identification sub-code signal, to provide recorded numbers respectively identifying programs which are sequentially recorded on the tape.

4 Claims, 5 Drawing Sheets

MUSIC START SIGNALS IN A MAGNETIC RECORDING/REPRODUCING DEVICE

BACKGROUND OF THE INVENTION

The present invention relates to a magnetic recording/reproducing device typified by the R-DAT system in which an audio analog signal is converted into a digital signal which is recorded on the inclined track of a magnetic tape by a rotary head and, thereafter, reproduced and converted back into the audio analog signal which is then outputted.

The R-DAT system was recently standardized. Since the audio analog signal is converted into the digital signal to be recorded and reproduced in the R-DAT system, high-degree audio information can be enjoyed for a long period of time. A large number of tunes or programs can be recorded on a single magnetic tape in the R-DAT system. Code signals for the tunes or programs can be additionally recorded on the tape so that a desired tune can be freely selected from among the other tunes.

Each inclined track has a PCM (pulse code modulation) central area P, in which the digitized (pulse-code-modulated) audio signal is recorded, and two sub-code areas ($S_1$ and $S_2$) which are located before and behind the PCM area and in which sub-code signals are recorded.

In the standardization, a start identification signal, which is one of the controlling identification signals in the sub-code areas, is required to be 1 for a prescribed time (9 seconds or about 600 tracks) from the beginning or head of the tune or program and to be 0 thereafter in the tune.

In the standardization, a SC2 start flag signal, which is one of the optional code signals (ID-1=00) in the identification recording section (PCM-ID) of the PCM area, is allowed to be 1 for the prescribed time (9 seconds) from the head of the program or tune and be 0 thereafter.

Thereafter, the head of the tune or program can be quickly searched by rapidly winding or rewinding the magnetic tape and locating the tape portion in which the start identification signal or the SC2 start flag signal is 1.

On the other hand, the method of recording the code signals for quick searching-out has not yet been standardized. In the simplest recording, a user listens to a tune to search out the head of the tune and, then, manually records a code signal for the head of the tune. However, this simple recording technique not only is complicated in operation but also has the drawback that it is impossible for the user to leave the recording device during the recording. Therefore, the efficiency of the recording is low.

Also, a program signal (program number signal) corresponding to early program may be recorded as another one of the sub-code signals. In a conventional device, a program head detection signal, which is the start identification signal, and the program number signal are separately recorded. For that reason, the recording operation is further complicated. Sometimes, one of the signals is recorded but the other is not recorded, so that it is difficult to accurately search out a desired program.

SUMMARY OF THE INVENTION

The present invention was made in consideration of the above-described drawbacks. Accordingly, it is an object of the present invention to provide a magnetic recording/reproducing device in which the beginning or head of a tune or program is detected in an input signal so that a code signal indicating the head is automatically recorded.

In the magnetic recording/reproducing device, the input signal, which is an analog signal, is converted into a digital signal; the code signal is added to the digital signal; and the digital signal containing the code signal is modulated in a predetermined system and recorded on a magnetic tape by a rotary head. The device is characterized by comprising a detection circuit which detects the head of the program or tune in the input signal before the input signal is modulated in the predetermined system; a time-measuring circuit which measures a prescribed time since a detection signal was outputted by the detection circuit and a code control circuit which sets the start information of the code signal at a prescribed value.

When the head of a tune is detected in the input signal by the detection circuit before the modulation of the input signal, the time-measuring circuit is caused to start measuring the time, and the start information of the code signal is automatically set at the prescribed value. When the time measuring circuit has finished measuring the prescribed time, the automatic setting of the code signal by the code control circuit is terminated.

Since the magnetic recording/reproducing device has the above-described construction and operation, the necessary code signal can be automatically and accurately recorded when the head of the tune is detected. The recording operation is thus simplified so that it is convenient to record a large number of tunes.

It is also another object of the present invention to provide a magnetic recording/reproducing device in which a program head detection signal and a program number signal are simultaneously and automatically recorded. The device is characterized by comprising a moving means for moving a magnetic tape; a first detection means for detecting the non-sound portion of an input signal; a generation means for generating the program head detection signal and the program signal; a recording means for recording the input signal, the program head detection signal and the program number signal on the magnetic tape; a reproduction means for reproducing the signals recorded on the magnetic tape; and a control means for controlling the generation means, depending on the output of the first detection means, to simultaneously record the program head detection signal and the program number signal at the head of a program.

When the non-sound portion of the input signal is detected by the first detection means, the generation means is controlled by the control means to simultaneously generate the program head detection signal and the program number signal to simultaneously record them.

Since the magnetic recording/reproducing device has the above-described construction and operation, the operating properties of the device are further enhanced to enable accurate searching of a desired program.

DETAILED DESCRIPTION OF PREFERRED EMBODIMENTS

Figure 1:
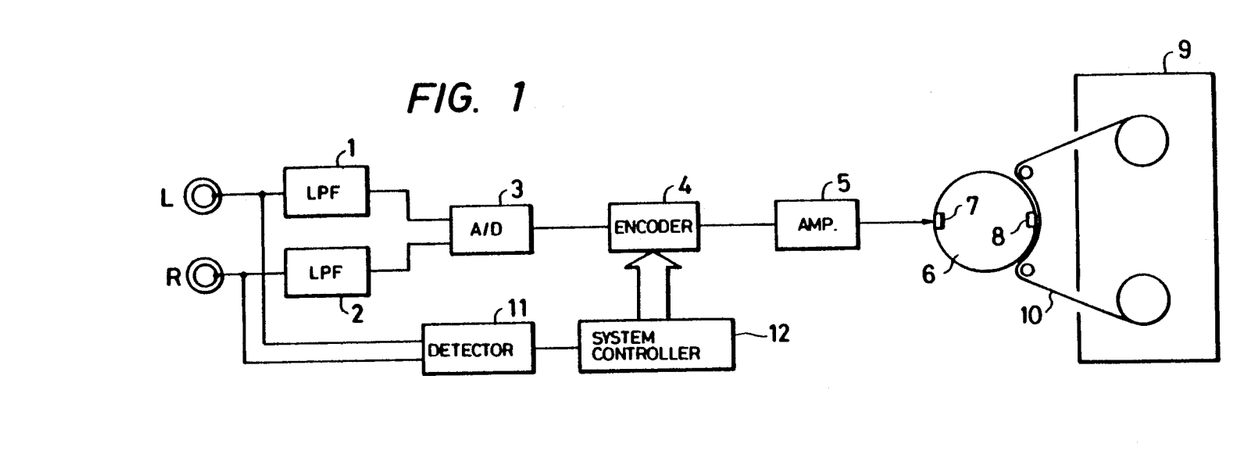
FIG. 1 is a block diagram of a magnetic recording/reproducing device which is a preferred embodiment of the present invention.

As shown in FIG. 1, audio analog input signals in a right channel R and a left channel L are applied to low-pass filters 1 and 2 which remove high-frequency signal portions of, for example, 20 kHz and higher. The signals are then sent the an A/D conversion circuit 3 which converts the audio analog signals into digital (PCM) signals. The digital signals are sent to an encoder 4. Necessary code signals, such as a parity code signal, a sub-code signal and an automatic track-finding signal, are cross-interleaved in the digital signals in the right and the left channels by the encoder 4. The code signals, except the automatic track finding signal, are subjected to what is called 8/10 modulation in which 8-bit data are converted into 10-bit data.

The input analog signals are also applied to a detection circuit 11 to detect the head of each tune. When the head of the tune is detected, the detection circuit 11 sends out a detection signal to a system controller 12 in the form of a central processing unit or the like. The system controller 12 sends out a control signal to the encoder 4 upon the reception of the detection signal, so that a start identification signal, which is one of the controlling identification signals, or a start flag signal, which is one of the optional code signals, is set at a logic 1 by the encoder. The setting at logic 1 is continued until a prescribed time, such as 9 seconds elapses after the output of the detection signal from the detection circuit 11. When the prescribed time has elapsed, the start identification signal or the start flag signal is set at a logic 0.

The digital signals processed and modulated by the encoder 4 are amplified by an amplification circuit 5 and then applied to rotary heads 7 and 8 attached to a rotary drum 6 and located at an angular distance of 180° from each other. A magnetic tape 10, pulled out of a cassette 9, is wound by an angle of 90° on the rotary drum 6. The PCM audio signals and the code signals added thereto are recorded on the inclined track of the magnetic tape 10 by the rotary heads 7 and 8.

Figure 2:
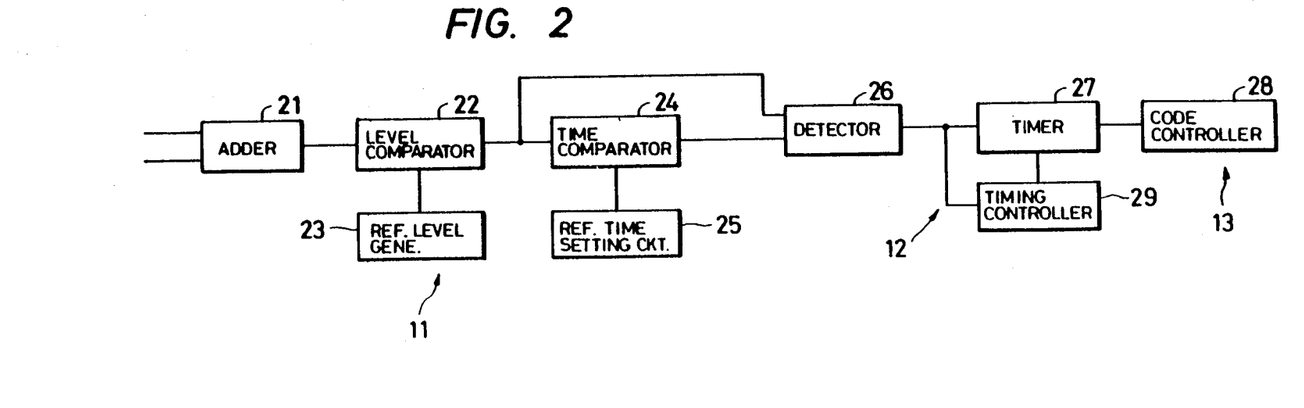
FIG. 2 is a more detailed block diagram of the device.

FIG. 2 is a more detailed block diagram describing how to record the code signals. The audio signals in the right and the left channels are added together by an addition circuit 21. The levels of the audio signals can be detected for the individual channels, respectively. However, if such detection is performed, not only is the number of circuit elements increased thereby making the equipment more expensive, but, also, the ratio of the input level to a reference level becomes lower than that in the case of the addition so as to make it more difficult to accurately detect the head of the tune at which a state of signal absence changes into a state of signal presence. For that reason, it is preferable to add the audio signals in the right and the left channels to each other to increase the level of the input signal relative to the reference level.)

The output of the addition circuit 21 is applied to a level comparison circuit 22 which compares the level of the output with the reference level which is set by a reference level generation circuit 23 and can be optionally adjusted. When the level of the output of the addition circuit 21 is not higher than the reference level, the level comparison circuit 22 sends out a low-level signal. When the level of the output is higher than the reference level, the circuit 22 sends out a high-level signal.

A time comparison circuit 24 compares the duration of a low level output of the level comparison circuit 22 with a reference time which is set by a reference time setting circuit 25 and can be optionally adjusted When the duration is shorter than the reference time, the time comparison circuit 24 sends out a low-level signal. When the duration is longer than the reference time, the circuit 24 sends out a high-level signal.

When the outputs of both the level comparison circuit 22 and the time comparison circuit 24 are high-level signals, a judgment circuit 26 sends out a detection signal so as to operate as an AND gate. In other words, the detection signal is sent out by the detection circuit 26 at the very time when the state of signal presence which corresponds to the head of the tune is inputted after the termination of the state of signal absence which corresponds to the interval between the tunes and lasts for the reference time or more.

A time-measuring circuit (timer circuit) 27 sends out a high-level control signal to a code control circuit 28 for a period of time from the output of the detection signal to the lapse of the prescribed time such as 9 seconds.

The code control circuit 28 sets the start identification signal or the start flag signal at a logic 1 while the circuit is receiving the high-level control signal. The code control circuit 28 sets the start identification signal or the start flag signal at a logic 0 when the circuit receives a low-level control signal after the lapse of the prescribed time.

The head of the tune is thus detected from the analog signals. However, the head of the tune can be also detected from the digital signals right after they are converted from the analog signals by the A/D conversion circuit 3.

If the head of the tune is detected at the encoder stage 4, the detection is late. For that reason, it is not preferable to detect the head of the tune at the encoder stage 4.

If the time of the output of the detection signal by the detection circuit 26 and that of the addition of a logic 1 signal by the code control circuit 28 do not coincide with each other, the output of the high-level signal by the time-measuring circuit 27 is delayed by a timing control circuit 29 or the like, which operation is done to cause the times to coincide with each other.

If the time of the detection of the head of the tune is late, the code control circuit 28 is regulated by the timing control circuit 29 to delay the addition of the code signals to the audio signals.

Another embodiment of the present invention is hereafter described with reference to FIGS. 3-6.

Figure 3:
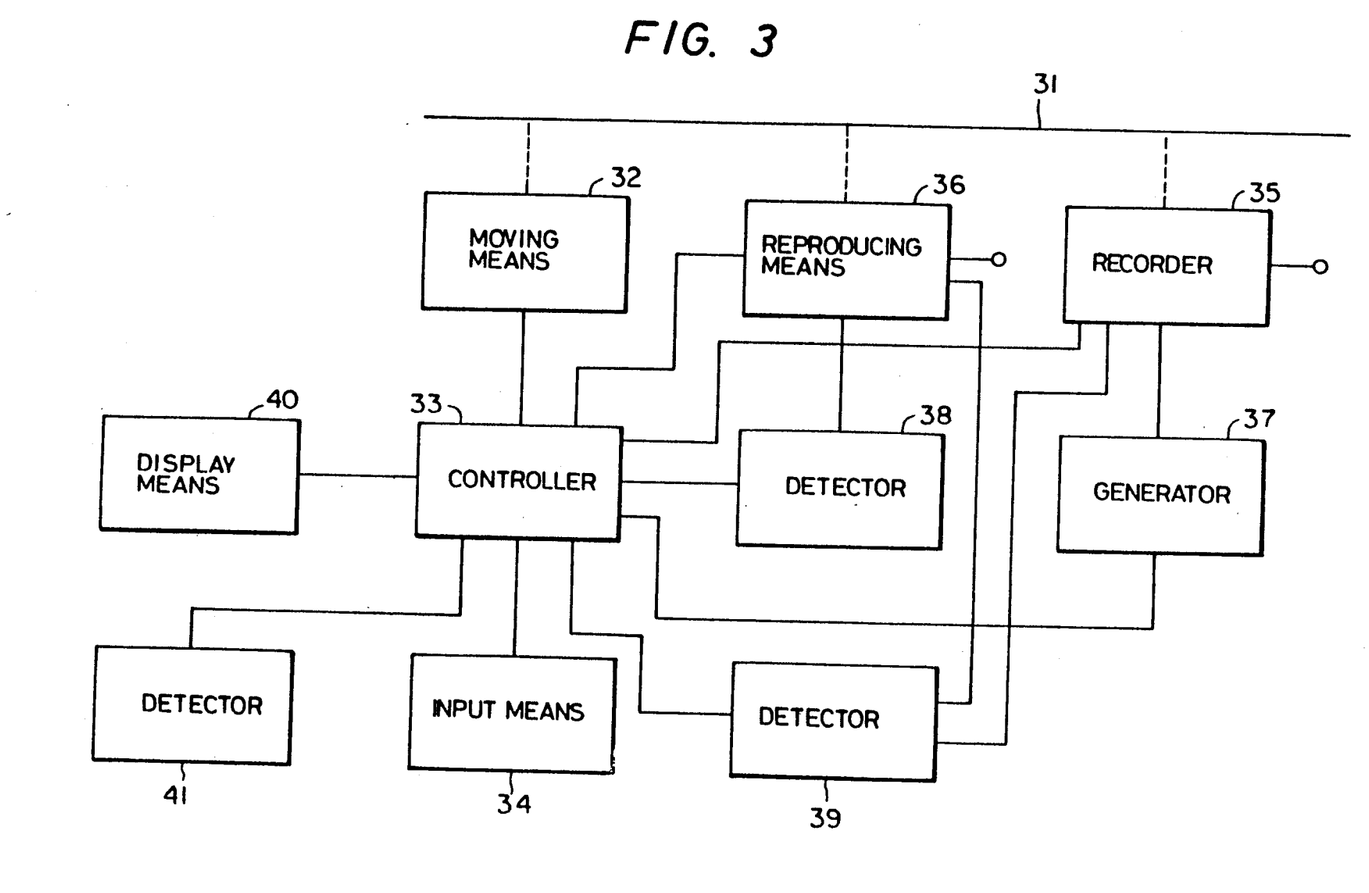
FIG. 3 is a block diagram of a magnetic recording/reproducing device which is another embodiment of the present invention.

Shown at 31 in FIG. 3 is a magnetic tape which is moved by a moving means 32 including a capstan, a pinch roller, a reel motor and so forth which are not shown in the drawings.

A control means 33 is made of a microcomputer or the like so as to take prescribed instructions inputted through an input means 34 made of switches, a keyboard or the like.

Signals are recorded on and reproduced from the magnetic tape 31 by a recording means 35 and a reproduction means 36 which include a rotary head which is switched for recording or reproduction.

A start identification signal as a head detection signal, a skip identification signal and a program number signal are generated by a generation means 37. These signals are detected from the reproduced signal by a detection means 38. Each of the generation means 37 and the detection means 38 can be made of separate means corresponding to the signals respectively.

The program head portion (non-sound portion) of the recorded or reproduced signal is detected by a detection means 39.

A mistaken erasure or recording prevention member for a cassette is detected by a detection means 41.

Figure 4:
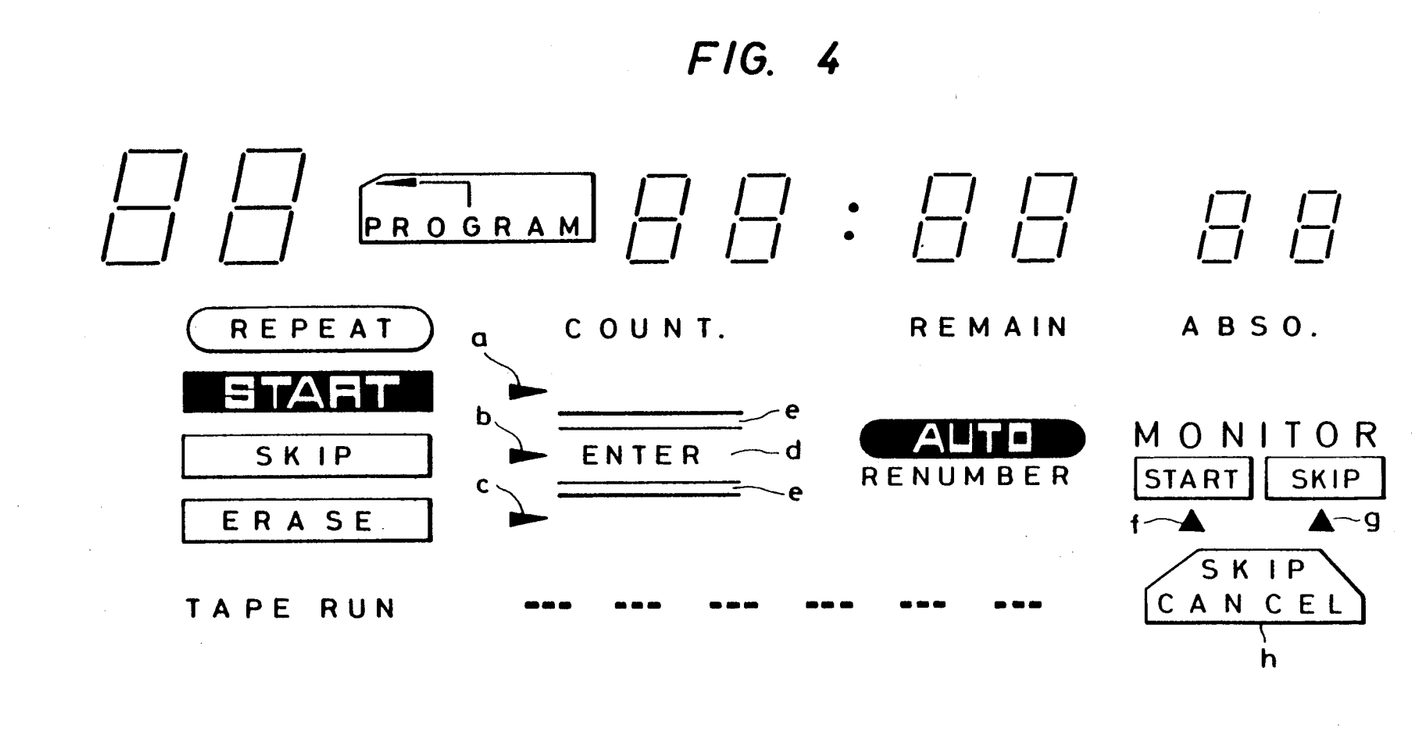
FIG. 4 shows a plan view of the display means of the device.

Prescribed information is displayed by a display means 40 as shown in FIG. 4. A part of the display means 40 constitutes a part of the input means 34.

When a recording mode is set by operating the input means 34, the moving means 32 and the recording means 35 are regulated by the control means 33 to subject an input signal to A/D conversion and prescribed processing and, then, record the signal on the magnetic tape 31.

The input signal (recorded signal) is also applied to the detection means 39. When the sound portion (program head portion) of the input signal behind its non-wound portion (inter-program portion) lasting for a prescribed time (n seconds) or more is detected by the detection means 39 (and right after the recording is started), the generation means 37 is regulated by the control means 33 to generate the start identification signal and the program number signal. These signals are supplied to the recording means 35 so that the signals are recorded as sub-code signals in the sub-code areas $S_1$ and $S_2$ of the track of the magnetic tape 31 for 9 seconds (600 tracks).

The display sections a and f of the display means 40 are lit by the control means 33 throughout the recording.

The program number which is indicated by the program number signal is automatically increased by one every time the inter-program portion of the input signal is detected.

Figure 5:
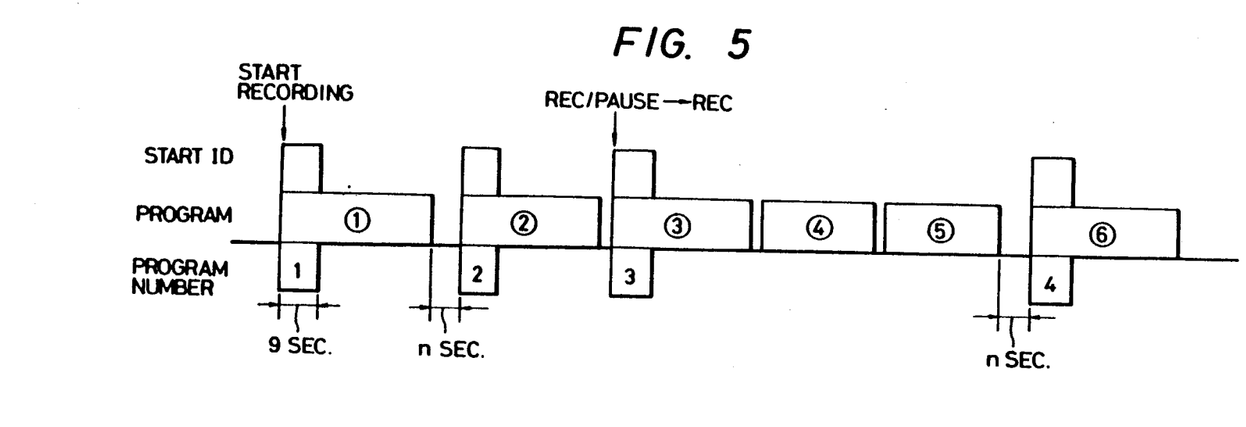
FIGS. 5, 6 and 7 are graphs illustrating the operation of the device.

The start identification signal (S-ID) and the program number signal (P) are thus automatically recorded at the head of the program for 9 seconds, as shown in FIG. 5.

When the recording mode is once changed to a record/pause mode during recording and the record/pause mode is changed back to the recording mode, the start identification signal and the increased-by-one program number signal are recorded. In this case, if the inter-program portion of the input signal lasts for less than n seconds, such as 2 seconds, the start identification signal and the program number signal are not recorded for the following program. However, in that case, the start identification signal can be recorded by manual operation.

When a reproduction mode is selected by the input means 34, the moving means 32 and the reproduction means 36 are regulated by the control means 33 to move the magnetic tape 31 to demodulate and process the reproduced signal and then subject it to D/A conversion for output.

When a prescribed key (identification mode key) of the input means 34 is operated in the reproduction mode in order to record the start identification signal, one of the display sections a, b and c (shown in FIG. 4) of the display means 40 is sequentially lit by the control means 33 in accordance with the number of times of the operation of the key. Since the start identification signal is now to be recorded, the key is operated to light the display section a. When the preparation for recording the start identification signal is completed, a display section d is lit by the control means 33. When the head of a program is confirmed by listening to a reproduced sound, the user of the magnetic recording/reproducing device presses the display section d which constitutes a part of the input means 34. At that time, display sections e, located over and under the display section d, are intermittently lit by the control means 33. At the same time, the start identification signal is sent out by the generation means 37 and recorded on the magnetic tape 31, but the program number signal is not recorded thereon. When the recording for 9 seconds is completed, the display sections e are put out.

Figure 6:
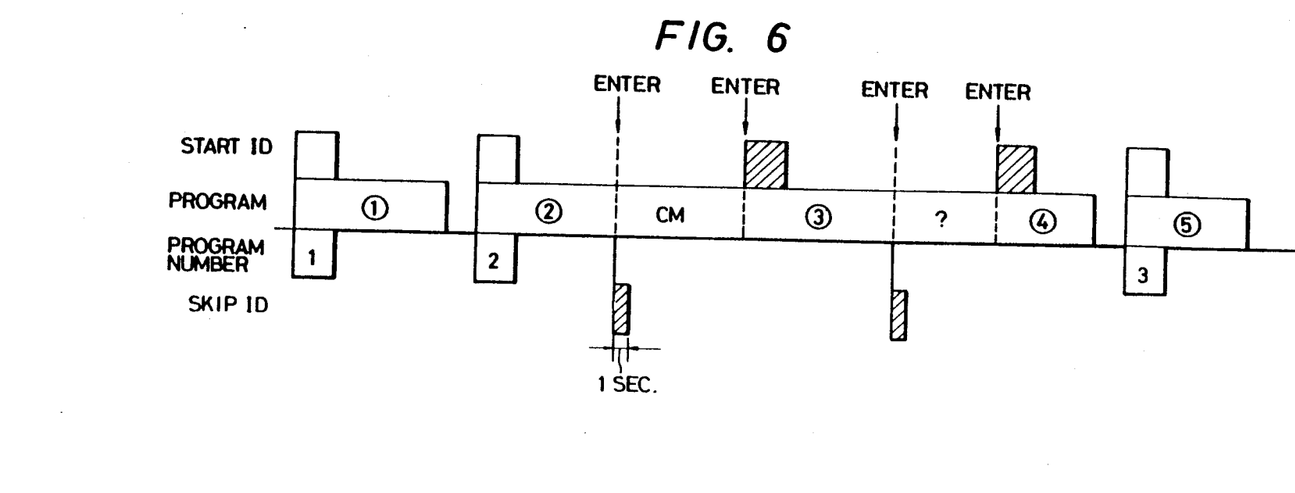

The start identification signal can thus be recorded in a desired position by operating an entry key (display section d), as shown in FIG. 6.

Manual recording can be performed in the recording mode as well. In manual recording, the start identification signal and the program number signal are recorded in a position corresponding to the operation of the entry key. The program number indicated by the program number signal is increased one by one in manual recording in the recording mode.

When a skip identification signal is to be recorded, a reproduction mode is selected, and the identification mode key is operated to light the display section b. When the preparation for recording the skip identification signal is completed, the display section d is lit. The display section d is pressed when the position to which a skip is to be made has come during listening to a reproduced sound. At that time, the display sections e are intermittently lit, and the skip identification signal sent out by the generation means 37 is recorded as a sub-code signal in a sub-code area of the magnetic tape 31 for 1 second. When the recording of the skip identification signal is completed, the display sections b and e are extinguished and the display section a is lit. At that time, a mode for recording the start identification signal is immediately set, and an indication for urging the user to record the start identification signal is made.

When the skipped portion of the reproduced signal has ended, and its other portion to which it is desired to listen has begun, the user presses the entry key. At that time, the display sections e are intermittently lit, and the start identification signal is recorded for 9 seconds. After the start identification signal is recorded, the display sections e are put out. Throughout these operations, the display section a remains lit, and the display section b is never automatically lit instead of the display section a. In order to record the skip identification signal thereafter, the input means 34 is operated to light the display section b as described above.

The skip identification signal and the start identification signal corresponding thereto can thus be recorded in a desired position, as shown in FIG. 6.

The start identification signal can be also recorded by manually operating the identification mode key again after the skip identification signal is recorded. However, if this manual operation is performed, not only are the operating properties of the magnetic recording/reproducing device deteriorated but also the user might forget to record the start identification signal corresponding to the skip identification signal. For that reason, it is preferable that the mode for recording the start identification signal, or at least a mode for making an indication for urging the user to record the start identification signal, is automatically set after the skip identification signal is recorded, as described above.

A desired program can be quickly searched out by utilizing the start identification signal or program number signal recorded as described above. For that purpose, the ordinal number of the desired program, or the cardinal number of programs located forward or backward between the current program and the desired program, is inputted by the input means 34. As a result, the moving means 22 is regulated by the control means 33 to move the magnetic tape 31 about 200 times faster than normal recording or reproduction. At that time, the start identification signal or program number signal is detected by the detection means 38 from the reproduced signal sent out by the reproduction means 36. After the desired program is searched out, normal reproduction is performed.

After the skip identification signal is detected by the detection means 38 during normal reproduction, the magnetic tape 31 is rapidly moved until the detection of the next start identification signal so as to resume normal reproduction with the program corresponding to the next start identification signal.

The erasure of the start identification signal once recorded will now be described. For erasure, the reproduction mode is set first, and the identification mode key is operated to light the display section c. When the start identification signal is detected by the detection means 33 from the reproduced signal, the display section f of the display means 40 is lit by the control means 33 to notify the user that the start identification signal is detected, and the display section d is lit by the control means 33 to notify the user that the switch to be operated next is the entry key. The user is, thus, guided for operation.

When the display section d is pressed during the lighting of the display sections d and f for 9 seconds (during the detection of the start identification signal). the display sections e and f are intermittently lit by the control means 33, and the moving means 22 is regulated by the control means to move the magnetic tape 31 backward.

After the head of the start identification signal is detected, the magnetic tape 31 is moved forward again so that the start identification signal is erased therefrom. The erasure is performed for slightly longer than 9 seconds (for 10 seconds, for example). When the erasure is completed, the display sections e and f are extinguished.

When the start identification signal is erased, the recorded program number signal corresponding thereto is also erased to prevent the recorded program number signal from remaining alone and being wrongly searched out while there is no recorded start identification signal corresponding thereto.

The erasure of the recorded skip identification signal will now be described. A display section h constituting a part of the input means 34 is first pressed to set a skip cancellation mode (at this point in time, the display section h is lit). As a result, no skip is made even if the skip identification signal is detected The reproduction mode is then set in the same manner so that the erasure of the recorded start identification signal, so that the display section c is lit.

When the recorded skip identification signal is detected from the reproduced signal, a display section g is lit to indicate that the recorded skip identification signal is detected, and the display section d is also lit. The user is, thus, again guided for operation.

Since the skip identification signal is recorded for only 1 second, it is not easy to operate the display section d within that period of time. For that reason, the display sections d and g are lit for a prescribed time T (5 seconds, for example) longer than the period.

After the display section d is pressed during the lighting of the display sections d and g, the display sections e and g are intermittently lit and the magnetic tape 1 is once stopped and then moved backward.

After the head of the recorded skip identification signal is located at the rotary head, the magnetic tape 1 is moved forward again so that the skip identification signal is erased for slightly longer than 1 second (for 2 seconds, for example). When the erasure is completed, the display sections e and g are put out.

Figure 7:
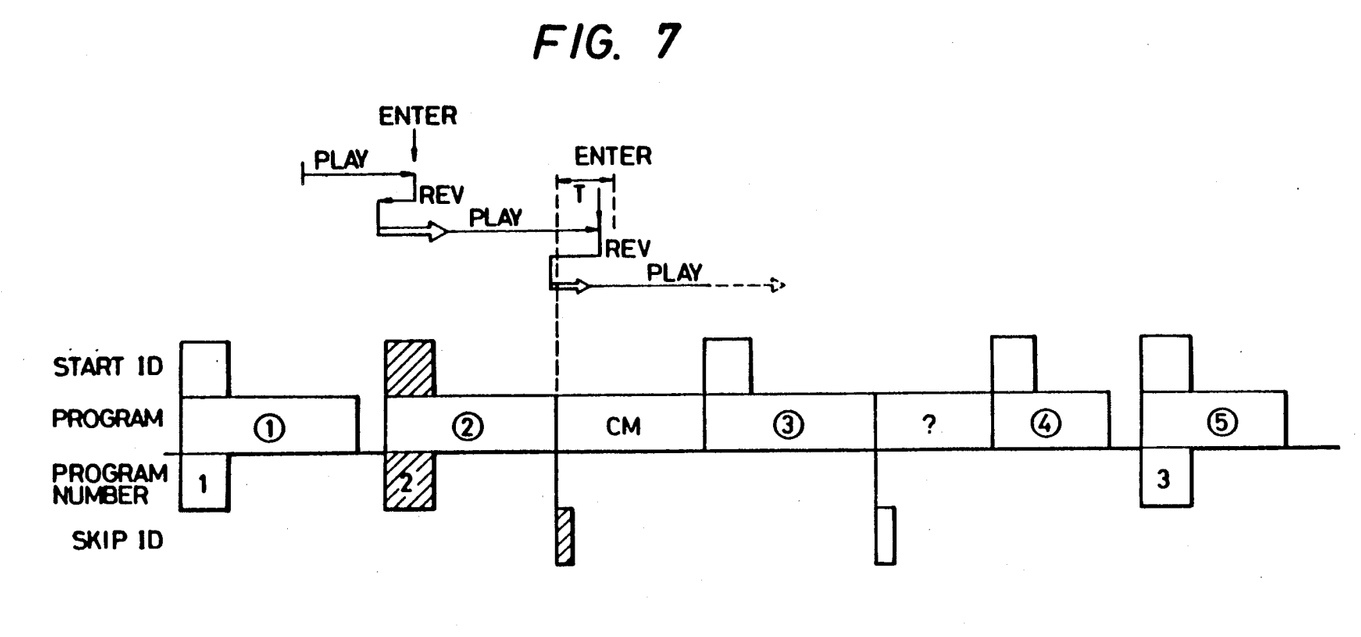

The recorded start identification signal and the recorded skip identification signal at desired positions can thus be erased, as shown in FIG. 7. The start identification signal and the skip identification signal are recorded on the magnetic tape by setting each of the prescribed bits of the sub-code signals to logic 1. On the other hand, the start identification signal and the skip identification signal are erased by setting their bits to logic 0.

When the mistaken erasure or recording prevention member for the cassette is being detected by the detection means 41 (in this case, the start identification signal and the program number signal are not automatically recorded). the control means 33 acts to keep the display sections a, b and c from being lit by operating the identification mode key. As a result, the user is made unable to select the display sections and is, thus, notified that he cannot perform recording or erasure. At that time, even if the display section d is pressed, it is in vain.

When the output of the detection means 41 is indicating that recording can be performed, not only can one of the display sections a, b and c be selected (lit) by operating the identification mode key, but also the display section d can be lit by the operation as long as recording or erasure can be performed. For that reason, it is more clarified that recording can be performed, and the user is notified of a switch to be operated next. The user is, thus, guided for operation.

When the start identification signal or the skip identification signal is detected in normal reproduction (in which a start identification signal or skip identification signal recording or erasure instruction is not inputted and the display sections a, b and c are left dark), the display sections f and g are lit for 9 seconds and 1 second, respectively, and the display section d is distinguished for that period of time. For that reason, the user is notified that he cannot double record the start identification signal or the skip identification signal in the place where the signal is already recorded. Double recording positions are thus prevented from slightly deviating from each other to make the length of recording of the start identification signal or the skip identification signal larger than 9 seconds or 1 second.

Exclusive switches and display sections, which correspond to the recording and erasure of the start identification signal and those of the skip identification signal, may be provided. However, if such switches and display sections are provided, the number of the switches and the like of the input means 34 not only increases to degrade the operating properties of the magnetic recording/reproducing device, but also the installation spaces for the input means 34 and the display means 40 expand, thereby making the device larger. For that reason, it is preferable to perform the input of instructions of selection and execution by using the identification mode key and the entry key as in the above-described embodiment.

If the display sections d and h are used only for displaying, keys (an entry key and a skip cancellation key) corresponding to the display sections are provided in the input means 4.

Although the present invention is described above with regard to its application to the R-DAT system, the present invention can be also applied to an 8-mm video tape recorder and other magnetic recording/reproducing devices.

What is claimed is:

1. A magnetic recording/reproducing device in which an input analog signal is converted into a digital signal, a first code signal is added to the digital signal, and the digital signal containing the code signal added thereto is modulated and then recorded on a magnetic tape by a rotary head, said device being characterized by the improvement comprising: detection circuit means for detecting the head of each program in the non-sound portion of the input signal before the input signal is modulated and for producing a corresponding detection signal; time measuring circuit means for measuring a prescribed time interval beginning with the detection signal produced by said detection circuit means; and code control circuit means for setting start information of the code signal at a prescribed value for the prescribed time interval and for recording the code signal on the tape.

2. A magnetic recording/reproducing device according to claim 1 further comprising generating means for generating for each program a second code signal indicative of a unique program number for each of a plurality of programs to be sequentially recorded on the tape, said code control circuit means being responsive to said generating means to record said second code signal simultaneously with said first code signal.

3. A magnetic recording/reproducing device comprising moving means for moving a magnetic tape; detection means for detecting the non-sound portion of an input signal and producing a corresponding output; generation means for generating a program head detection signal and a program number signal; recording means for recording the input signal, the program head detection signal and the program number signal on the tape; reproduction means for reproducing the signals recorded on the tape; and control means for controlling said generation means, depending on the output of said detection means, to simultaneously record the program head detection signal and the program number signal on the tape beginning at the head of a program.

4. A magnetic recording/reproducing device as recited in claim 3, wherein said recording means comprises a rotary head for recording the input signal, the program head detection signal and the program number signal on common slant tracks on the tape.

* * * * *